United States Patent
Girling

[15] 3,652,230
[45] Mar. 28, 1972

[54] CRYSTALLIZATION APPARATUS WITH VERTICAL HELICAL CONVEYOR

[72] Inventor: Geoffrey William Girling, Hempstead, England

[73] Assignee: Benzole Producers Limited, London, England

[22] Filed: Dec. 24, 1968

[21] Appl. No.: 786,582

[30] Foreign Application Priority Data

Dec. 29, 1967 Great Britain ...................... 59,008/67
Feb. 8, 1968 Great Britain ........................ 6,208/68

[52] U.S. Cl. ............................................... 23/273 F, 62/58
[51] Int. Cl. ........................................................ B01d 9/04
[58] Field of Search ................................... 62/58; 23/273 F

[56] References Cited

UNITED STATES PATENTS

| | | |
|---|---|---|
| 2,617,273 | 11/1952 | Findlay ............................ 23/273 |
| 2,679,539 | 5/1954 | McKay ............................ 23/273 |
| 2,780,663 | 2/1957 | Gunness .......................... 23/273 |
| 2,833,835 | 5/1958 | Green et al. ..................... 23/273 |
| 2,956,414 | 10/1960 | Steinbacher et al. ............. 62/58 |
| 2,839,411 | 6/1958 | Vela ................................. 62/58 |
| 3,375,082 | 3/1968 | Graf ................................. 62/58 |
| 3,531,944 | 10/1970 | Lindley ........................... 62/58 |

Primary Examiner—Norman Yudkoff
Assistant Examiner—R. T. Foster
Attorney—Steward & Steward, Merrill F. Steward and Donald T. Steward

[57] ABSTRACT

Organic and inorganic substances are purified by a crystallization technique in which the initial material is first converted into a crystal-liquid slurry (by pre-melting and then cooling solid charging stock and pre-cooling liquid charging stock) and then feeding the slurry into a vertical crystallizing column wherein a temperature gradient is set up between the cooled upper end and the lower end thereof. A helical conveyor causes the crystals to descend in a spiral path to the bottom of the column in countercurrent to an upward flow of displaced liquid, where they are melted and drawn off as purified material. The technique results in an increased throughput through the column without affecting the purity of the product.

2 Claims, 5 Drawing Figures

FIG.2.
FIG.5.
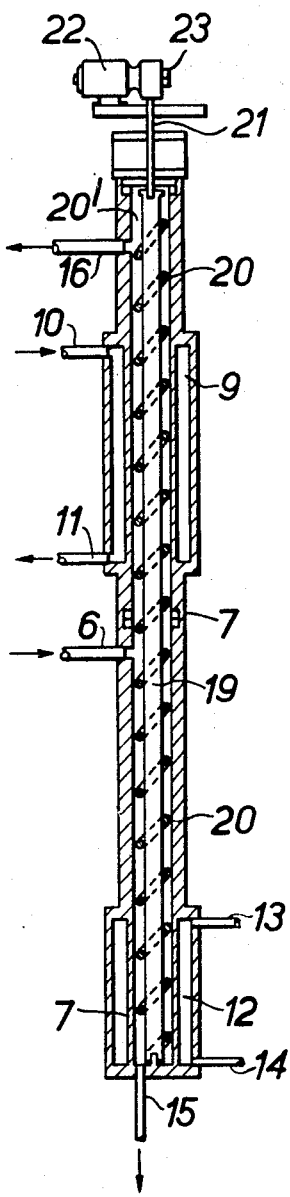
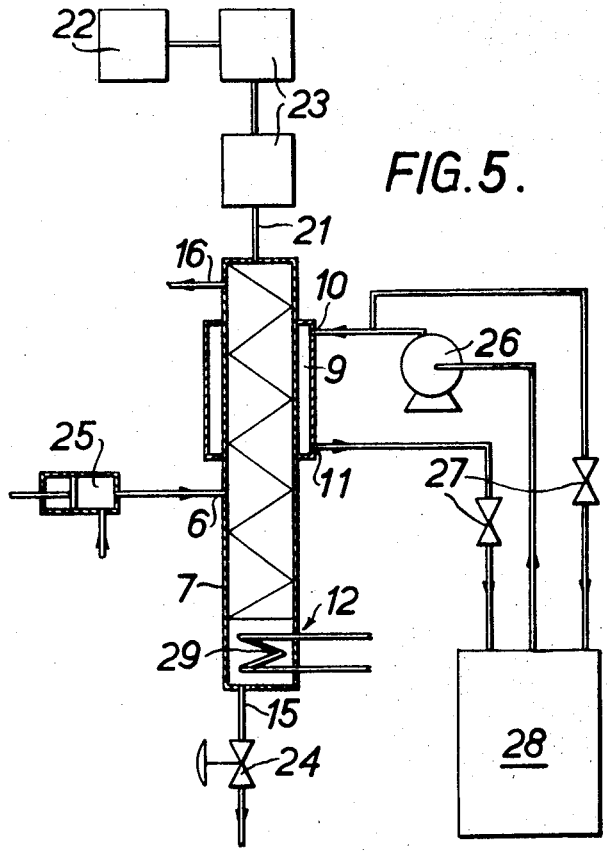

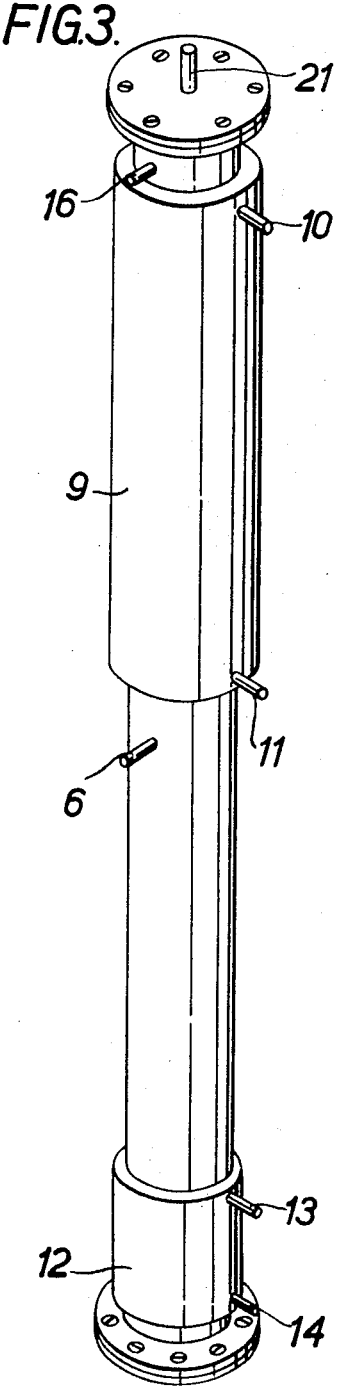
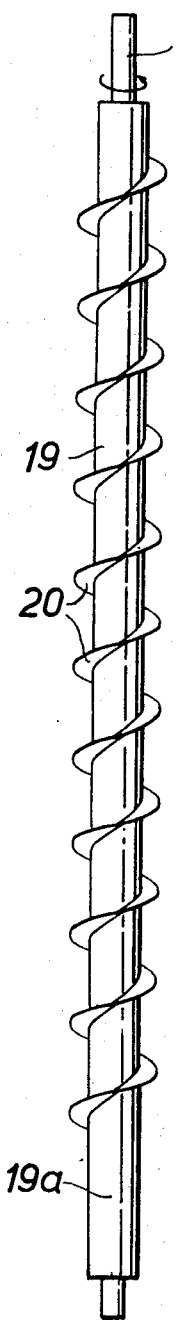
FIG.3.
FIG.4.

CRYSTALLIZATION APPARATUS WITH VERTICAL HELICAL CONVEYOR

This invention relates to a process for purifying organic materials and aqueous solutions by crystallization techniques and more particularly to the purification by such techniques of benzene. It is also applicable to some homologues thereof and to some other aromatic and alicyclic hydrocarbons.

Current material specifications for pure benzene require a low content of nonaromatic hydrocarbons, e.g., crystallizing point > 5.4° C. equivalent to < 0.2 percent impurities. Some of the straight-chain and cyclic hydrocarbons that commonly occur in benzene derived from coal cannot be removed by normal straight distillation so that other methods must be used for their separation. Compared with processes such as extractive and azeotropic distillation, crystallization has the advantages of lower thermal requirements and a performance that is largely independent of the nature of the hydrocarbon impurities that are present. This also holds in varying degrees for the purification of similar aromatic hydrocarbons.

In established crystallization processes for the separation and purification of organic substances of the foregoing kind, crystallization is induced by cooling the material under treatment either by indirect contact or by direct mixing with the refrigerant, followed in either case by separation of the crystals from the mother liquor and any further washing or purification procedures.

It has also been proposed to feed the material to be purified to the middle of a vertical column, crystallization being effected therein by external cooling of the upper part of the column. The resulting crystals descend to the bottom of the column where they are melted by heating, a portion of the melt being withdrawn as the pure product. The remainder of the melt is displaced back up the column by the freshly descending crystals, thus producing a countercurrent flow of liquid and crystals above and below the raw material feed point. The fractional crystallization and/or crystal washing system thus established results in the continuous production of a pure material at the base of the column, a portion of which is bled off or withdrawn as stated, and in the concentration of the remaining constituents of the feed material at the top of the column. This is, in effect a continuous process not requiring any external recycle system.

In one such continuous crystallization process and apparatus, the vertical column is constructed as two concentric shells, in the annulus between which is positioned a positively rotated helix, extending the whole length of the column. Crystallization is effected in the annulus between the inner and outer cylinders, cooling being applied to either or both the inner and outer walls forming the annulus.

However, the difficulty arises in these attempts to scale up the throughput of the column that while the capacity of the annulus, and hence the potential throughput of the apparatus, increases with the square of the diameter of the column, the circumference of the column increases only linearly with the diameter so that in order to maintain an adequate ratio of heat transfer surface to capacity it is necessary to increase substantially the length of the cooling section. This difficulty is further aggravated if the width of the annulus is increased relative to the outside column diameter, as in this case the capacity is increased while the surface available for heat transfer on the inner wall of the annulus is decreased. It is therefore desirable to minimize the length of the column in order to avoid difficulties in its construction.

It is an object of the present invention to effect an increase in the throughput of such continuous column crystallization processes while at the same time avoiding the aforesaid constructional difficulties.

Accordingly, the present invention provides broadly for feeding the charging stock to the column, containing either a helix which is a sliding fit in the aforesaid annular space or one having a construction hereinafter to be described, in the form of a mobile slurry of crystals and liquid. In one aspect of the invention, in the case of a liquid charging stock this is achieved by precooling said liquid in addition to the cooling provided in or on the column. In another aspect, in the case of a charging stock which is solid at ambient temperature, this is achieved by first completely melting and then partly solidifying said stock in addition to the heat transfer to the stock provided in or on the column.

In yet a further aspect of the invention directed likewise to increasing the throughput of continuous crystallization processes without encountering constructional difficulties, the aforesaid charging stock in the form of a slurry of crystals and liquid is fed to a column in which the helix and the central shell are, in effect, integral and rotate together.

Accordingly, vertical column crystallization apparatus according to the invention also comprises a precrystallizer in which the charging stock is converted into a crystal slurry feeding into a vertical crystallizing column containing an axially mounted rotary inner shell, to the outside of which is fixed a helix making a close fit with the inner wall of the outer shell of the column. Provision is made for cooling the upper part of the outer column and if required, the upper interior part of the rotary inner shell. Heat is supplied to the lower part of the column.

One advantage of the construction of crystallization column according to the invention is that the rotating member may readily be fabricated by machining and other conventional steps from a rod or tube, or by fixing a helix round the outer cylindrical surface of such a tube. This procedure considerably simplifies the mounting of the resulting fabricated rotor and the provision of the necessary bearings and ensures that said rotor remains concentric with the outer shell during operation, concentricity remaining unaffected by the physical size of the column—a condition difficult of attainment with a large independent helix rotating in an annular space.

The pitch of the helix is preferably equal to ½ to 1½ times greater than the outside diameter of the helix while the width of the flights is preferably from ⅛ to ¼ of said outside diameter.

When precooling is effected by direct contact with a refrigerant, the refrigerant is preferably separated from the slurry before feeding the latter to the column purifier.

In the case of such liquid charging stocks if a mobile slurry can be obtained containing up to about $x$ percent by weight of crystals and such material is fed to the column crystallizer the amount of heat that must be extracted in the cooling section is reduced by about the same percentage; i.e., for a given throughput the heat transfer area requirement is reduced and for a given crystallizer the throughput is increased.

Thus, for example, in the purification of a benzene-containing charging stock in accordance with the present invention a mobile precooled slurry of the aforesaid kind may contain up to about 50 percent by weight of crystals, so that the aforesaid improvements are of this order of magnitude.

When the feed is supplied to the column as a liquid in accordance with the existing practice, the crystals descending the column at the level of the feed point are contaminated by adherent liquid of the same composition as the feed. If the feed is partly precrystallized in accordance with the present invention, say to the extent of 50 percent in the case of benzene, then the liquid contaminating crystals at the feed point will contain a correspondingly greater concentration of contaminants compared with the feed. The extra washing required for the production of uncontaminated crystals can be effected readily in the lower part of the column.

It has been found that operation of the conveying surfaces in the column crystallizer and if necessary, in the precooler, is facilitated by imparting to such surfaces a plated coating of mirror finish smoothness. The most suitable plating metal for the purpose has been found to be chromium, but nickel can also be used with advantage for the purpose, or the parts in question can advantageously be fabricated of polished stainless steel.

In order more clearly to understand the nature of the invention, reference is made to the accompanying drawings which illustrate diagrammatically and by way of example, some embodiments thereof with particular reference to the apparatus.

In said drawings:

FIG. 2 is a diagrammatic vertical section through a column crystallizer;

FIG. 3 is a perspective view of FIG. 2;

FIG. 4 is an elevation of the central shell and helix fast therewith, and

FIG. 5 is a schematic flow diagram.

Figure 1:
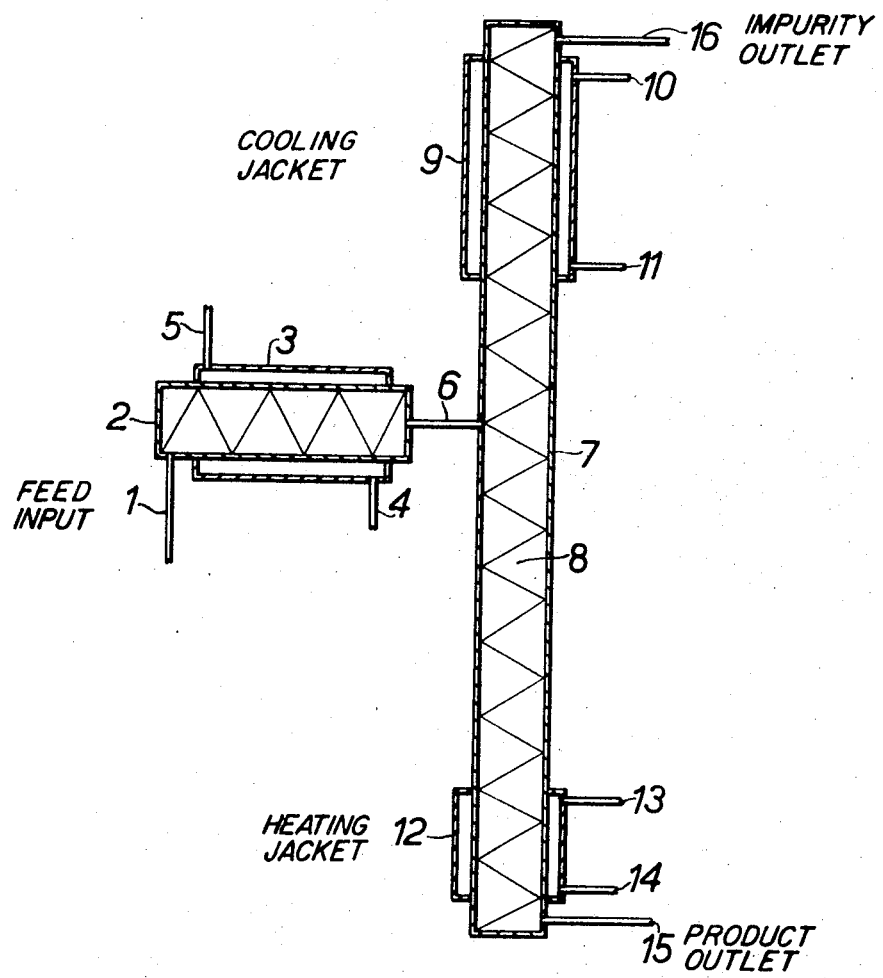
FIG. 1 depicts the manner in which a precrystallizer feeds into a crystallizing column.

Referring to FIG. 1, feedstock is supplied via a line 1 to the precrystallizer 2, which in this instance is a scraped surface crystallizer with a refrigerant jacket 3. Refrigerant enters the latter via a line 4 and leaves via a line 5. Slurry leaves the precrystallizer via a line 6 and enters the column crystallizer 7. This is equipped with a crystal conveying apparatus 8, which may be either of the kind in which a helix rotates in an annular space independently of a central fixed shell or of the kind wherein the helix is fast with a rotating central shell. The column crystallizer is also equipped with a cooling jacket 9 supplied with refrigerant via lines 10 and 11, and a heating system 12 supplied with a heating medium via lines 13 and 14. Pure benzene leaves the column via a line 15 and impurities via a line 16.

Reference will now be made to FIGS. 2 to 5, in which like parts are indicated by like reference numerals.

The column crystallizer has a shell 7 which has temperature controlled zones at 9 and 12, 9 being a cooling zone and 12 a heating zone. A central shell 19 carrying a helical conveyor 20 fast therewith, is rotatably mounted in the shell 7, the shaft 21 of which is driven by a motor 22 through reduction gearings 23. The charging stock, e.g., benzene, is fed through the port 6 to the annular zone 20′ (FIG. 2) formed between the central shell 19 and the outer shell 7.

Ports 10, 11 for the supply and discharge of a coolant to a jacket 9, and ports 15 and 16, are also provided with thermocouples for temperature control purposes. The flow of liquid is controlled by a flow control valve 24 (FIG. 5) and the setting thereof is adjusted, together with the flow of the coolant and of the charging stock via the feed port 6 and a feed pump 25, depending on the nature and impurity content of the substance under treatment and on the amount of reflux required. The flow of coolant to the upper zone 9 of the column crystallizer is controlled by a brine pump 26 and valves 27 in the flow and return lines to a coolant tank 28. Alternatively, a primary refrigerant, e.g., that known under the Registered Trade Mark "Freon," is circulated in the cooling jacket 9. The column is lagged.

In FIGS. 2 and 3, the zone 12 is heated by a water jacket. In FIG. 5, heating of the zone 12 is effected by an internal heating coil 29, using hot water, steam or oil, which may surround the plain lower end 19a (FIG. 4) of the central shell. It could also be heated electrically, or use could be made of the heat recuperated from the refrigerant condenser for the cooling jacket 9.

In the above described apparatus, the charging stock, e.g., benzene, in the form of a crystal slurry, is conveyed downwards from the cooling zone 9 to the heating zone 12, when the crystals are melted and withdrawn substantially completely through the line 15 and valve 24.

Comparative runs were made with a column crystallizer, 48 in. long by 2 in. diameter, fitted with a ½-in. cross section helix 20 with a pitch of 3 inches rotating at 140 r.p.m., used first by itself and afterwards in conjunction with a precrystallizer 2, 15 inches overall length by 2 inches diameter, fitted with a scraper/conveyor rotating at 210 r.p.m. The main column 7 was fitted with an external jacket 9, 6 inches long, through which was passed refrigerated brine. The feedstock was benzene with a crystallizing point (c.p.) of 5.0° C., and the column was operated so as to give a pure product corresponding to 95 percent of the feed, and an overhead impurity fraction corresponding to 5 percent of the feed.

When feeding benzene directly to the main column 7 and using a cooling jacket 9, 6 inches long, the maximum feed rate at which a product with a c.p. of 5.49° C. or higher could be obtained was 1.2 l./hr. Using the precrystallizer 2, a free-flowing slurry was obtained and fed to the column and the throughput increased to 2.8 l./hr.

In an apparatus of the foregoing kind with an outer shell 48 inches long by 2 inches internal diameter, the helix 20 had a major diameter of 2 inches and a minor diameter of 1¼ in. and a pitch of 2 inches The helix was rotated at 200 r.p.m. while benzene with a crystallizing point of 4.0° C. was fed to the column the upper part of which was fitted with a cooling jacket 9, 12 inches high, at the rate of 4 l./hr. The product from the bottom of the column had a crystallizing point of 5.53° C. (i.e., better than 99.99 percent purity) and was obtained in a yield of 85 percent based on the total feed.

An additional advantage of the precrystallization system according to the invention is that the precrystallizer 2 could be operated with a higher refrigerant temperature than in the main column, leading to higher refrigeration efficiency.

I claim:

1. Continuous crystallizing apparatus for the purification of an impure crystallizable liquid hydrocarbon by reflux crystallization, comprising: a vertically elongated chamber having a smooth internal wall and a circular cross section, and having a top end and a bottom end; inlet means intermediate said ends of said chamber for feeding said impure crystallizable hydrocarbon to said chamber; outlet means at said top end for outlet of crystallizable hydrocarbon containing an increased concentration of impurities; outlet means at said bottom end for crystallizable hydrocarbon in purified form containing a lower concentration of impurities; a cooling jacket around said chamber between said inlet means and said top end outlet means; a heating means located between said inlet means and said bottom end outlet means; said cooling jacket and heating means being relatively widely spaced apart axially on said chamber; a vertical helical conveyor within said chamber, said conveyor comprising a rotatable central column and a smooth, imperforate, helical flight secured around said column with the periphery of said flight in close proximity to said smooth internal wall of said chamber, the flight pitch of such helical flight being between ½ and 1½ times the external diameter of the helix, and the width of said helical flight defined between said internal smooth wall of said chamber and said rotatable column being from one-eighth to one-quarter of the external diameter of the helical flight, whereby there is defined in vertical cross section a zone for producing in said chamber relatively uniform axial flow of liquid having a substantial transverse flow component.

2. Apparatus as claimed in claim 1, which further includes an externally cooled precrystallizer fitted with an internal rotary scraper conveyor, and duct means leading from the discharge end of said scraper conveyor to said inlet means of said chamber.

* * * * *